F. MÜLLER.
THREAD MILLING HOB.
APPLICATION FILED FEB. 1, 1919.
1,348,304.
Patented Aug. 3, 1920.
3 SHEETS—SHEET 1.
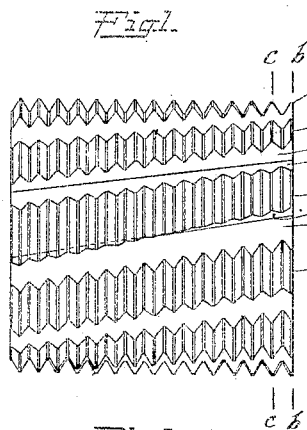
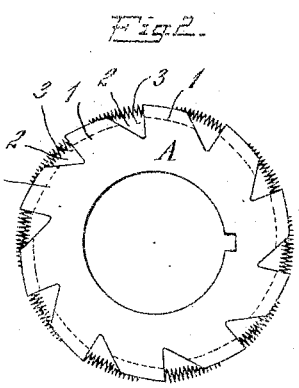
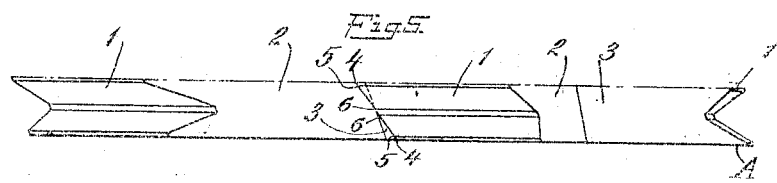
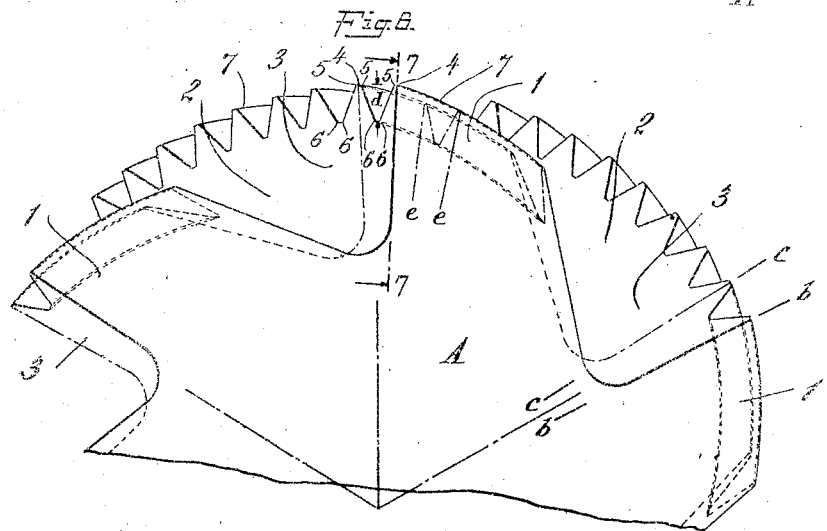
Inventor
Friederich Müller
By S. Jay Teller
Attorney

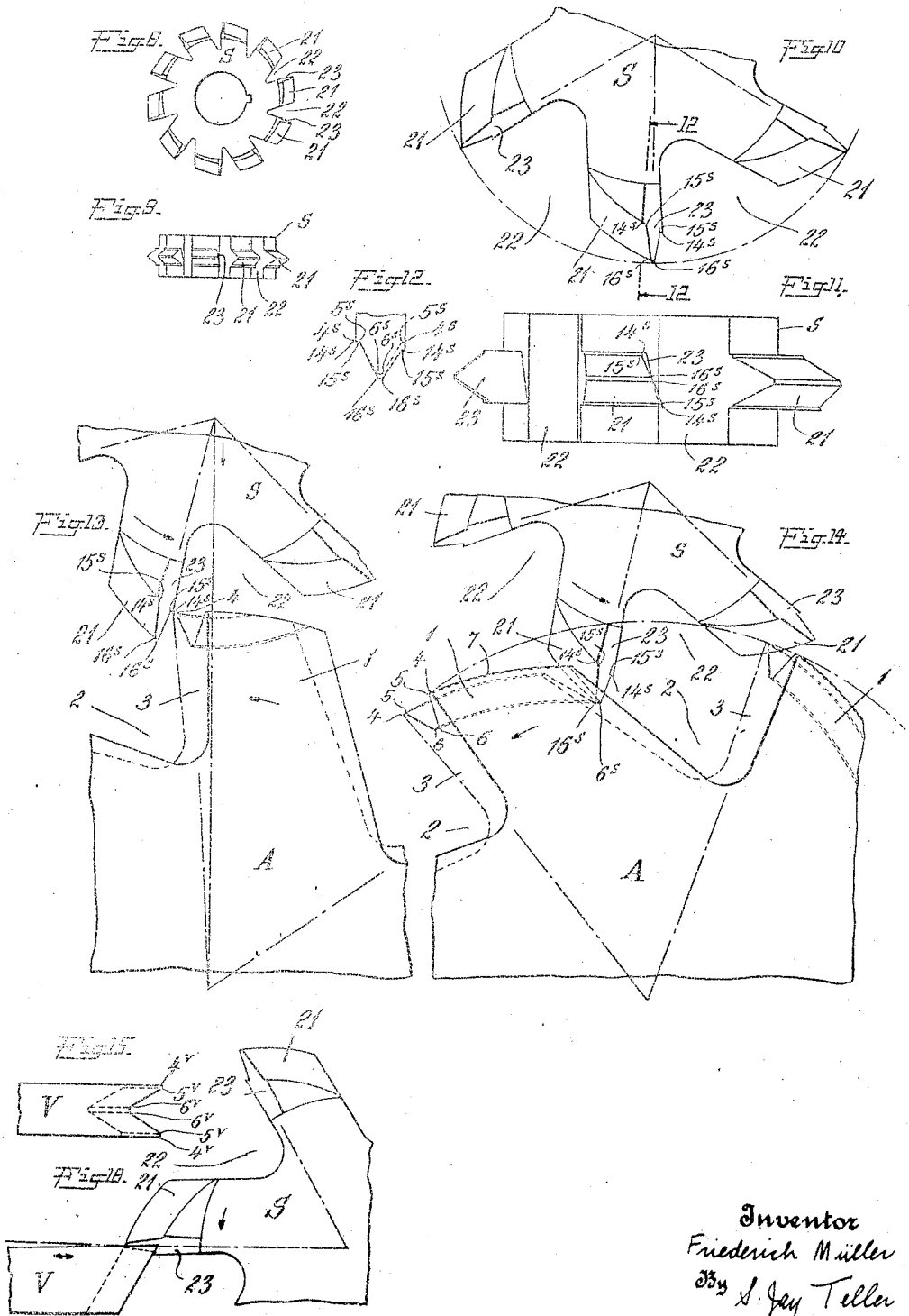

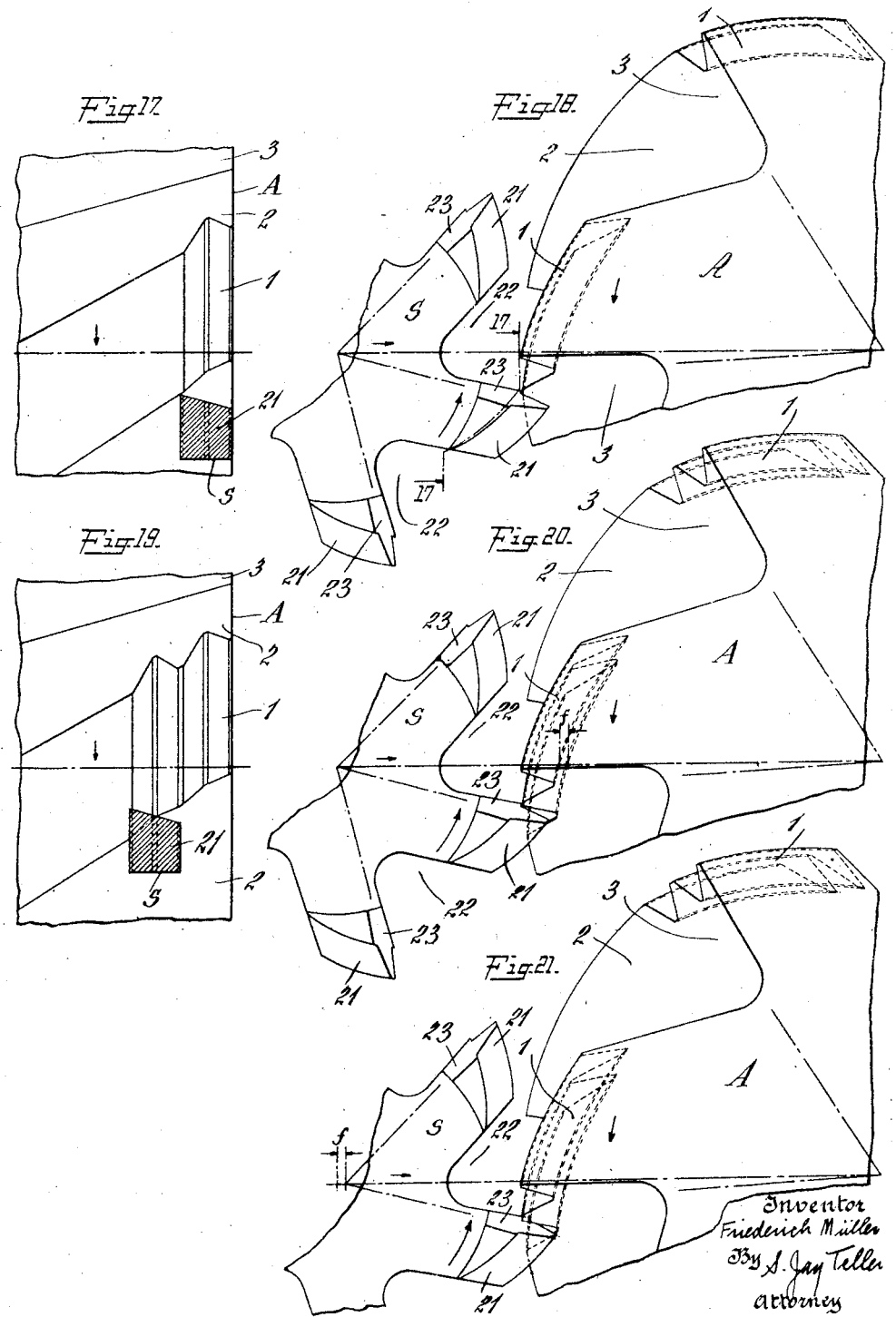

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

THREAD-MILLING HOB.

1,348,304.  Specification of Letters Patent.  Patented Aug. 3, 1920.

Application filed February 1, 1919. Serial No. 274,529.

*To all whom it may concern:*

Be it known that I, FRIEDERICH MÜLLER, a citizen of the United States, residing at Hartford, in the county of Hartford and State of Connecticut, have invented certain new and useful Improvements in Thread-Milling Hobs, of which the following is a specification.

The invention relates to milling cutters which are adapted to cut a series of uniformly spaced similar grooves. The best example of a cutter of this type is a hob such as is used for milling threads, the threads being completely cut during a single revolution of the part being threaded. A milling cutter or hob such as that referred to is adapted to cut a composite contour which consists of a number of equal elemental contours arranged at uniform distances. I will herein refer to cutters embodying the invention as thread milling hobs but it will be understood that the invention in its broader aspects is not so limited.

A hob embodying the present invention is in many respects similar to the milling cutter set forth in my copending application for milling cutters, Serial No. 268,349, filed December 26th, 1918. As pointed out in the said application, it is advantageous to provide milling cutters with cutting edges which are inclined with respect to the cutter axis so as to enable each of the successive teeth to engage the work gradually and to effect a shearing cut. This inclination of the cutting edges is important not only for cutters which are of uniform diameter throughout or which have a uniform taper, but also for formed or contour cutters in which the diameter varies from end to end in ways differing from a uniform taper, such cutters being those adapted to cut a predetermined contour other than a straight line.

The inclination of the cutting edges is particularly important in the case of thread milling hobs which are frequently of considerable length and which have a large number of thread cutting points at equal distances from the cutter axis. According to prior practice, thread milling hobs have been made with their cutting faces parallel with the axis; that is, with the cutting points of each row so arranged that they all engage the work at the same time, thus causing much shock and vibration. To reduce the shock and vibration as much as possible the hobs have been run at a slow speed, but even at the slow speed the hobs have worn rapidly and there has been a marked tendency toward rough and uneven cutting.

In accordance with the invention I have provided a hob having the cutting faces inclined with respect to the axis so that the cutting points of each row engage the work successively, the cutting action beginning at one end and being transferred from tooth to tooth in succession until the other end is reached. This form of hob practically eliminates shock and vibration and enables me to greatly increase the speed of cutting. In addition, I find that because of the absence of shock the wear on the hob is greatly reduced and the work is given a much smoother finish than was heretofore possible.

The principal object of the invention is to provide a milling cutter or thread milling hob which is adapted to accurately cut a predetermined composite contour such as a thread contour and which has its cutting edges longitudinally inclined with respect to the cutter axis for the purpose set forth and which is properly relieved.

I have shown in the accompanying drawings a thread milling hob embodying the invention, and I have also illustrated a method whereby the hob can be made. It will be understood, however, that the drawings are for illustrative purposes only and are not to be construed as defining or limiting the scope of the invention, the accompanying claims being relied upon for that purpose.

Of the drawings:

Figures 1 and 2 are side and end views respectively of a thread milling hob embodying the invention.

Figs. 3 and 4 are diagrammatic views illustrating different forms of threads.

Figs. 5 and 6 are enlarged diagrammatic plan and end views respectively of the hob. In these views there is shown a smaller number of teeth and the inclination of the cutting faces and the relief are considerably increased in order to bring out the principles of the invention more clearly. Fig. 6 shows the entire length of the hob, whereas Fig. 5 shows a section thereof between the lines $b$—$b$ and $c$—$c$ of Figs. 1 and 6.

Fig. 7 is a diagrammatic view illustrating certain features of the hob section shown in Figs. 5 and 6.

Figs. 8 and 9 are end and bottom views respectively of a preliminary milling cutter which may be used for milling the hob.

Figs. 10 and 11 are enlarged diagrammatic end and bottom views respectively of the preliminary cutter shown in Figs. 8 and 9. The cutter is shown as having a smaller number of teeth and as having increased inclination and relief in conformity with the increased inclination and relief shown in Figs. 5 and 6.

Fig. 12 is a diagrammatic view illustrating certain features of the preliminary cutter shown in Figs. 10 and 11.

Fig. 13 is a view illustrating the preliminary cutter shown in Figs. 10 and 11 in use for milling a section of a blank for the hob, the milling operation having been started but not finished.

Fig. 14 is a view similar to Fig. 13 but illustrating the blank completely milled.

Fig. 15 is a plan view of a lathe tool adapted to be used for shaping the preliminary milling cutter.

Fig. 16 is a diagrammatic view illustrating a method of shaping the preliminary milling cutter, use being made of the lathe tool shown in Fig. 15.

Fig. 17 is a diagrammatic fragmentary front view of a blank which is being milled. In this view one tooth of the preliminary milling cutter is shown in section along the line 17—17 of Fig. 18.

Fig. 18 is a diagrammatic fragmentary end view showing the preliminary milling cutter in operative relation with the blank, as illustrated in Fig. 17.

Fig. 19 is a view similar to Fig. 17 but showing the preliminary milling cutter and the blank in different relative positions.

Figs. 20 and 21 are views similar to Fig. 18 but showing the preliminary milling cutter and the blank in different relative positions.

Referring to the drawings, particularly to Figs. 1 to 7 thereof, A represents a thread milling hob embodying the invention. Such a hob may be made for cutting threads of any standard form and in Figs. 3 and 4 I have illustrated U. S. standard threads and Whitworth threads. For the sake of convenience and simplicity I have illustrated only U. S. standard threads in Figs. 1 and 2 and in the other figures, but it will be understood that there is no limitation of the invention on this account and that the thread contour may consist of straight lines or curves. Preferably in accordance with the standard thread forms each thread is symmetrical in outline as is also each groove between two threads.

The hob is provided with a plurality of generally longitudinal teeth 1 between which are grooves 2, the teeth and grooves being preferably spaced uniformly. The grooves 2 can be of any usual or preferred depth and shape, as required. The front wall 3 of each tooth constitutes a cutting face and this cutting face is radial or approximately so in order to provide a satisfactory cutting angle. Each tooth 1 is provided with a series of circumferentially extending ridges or tongues having grooves formed between them. The tongues with the grooves between them are so shaped and spaced as to correspond to the form and pitch of the threads to be cut. Preferably, as illustrated, the ridges or grooves of the several teeth are in circumferential register so as to follow the same paths when the hob is rotated.

In accordance with the invention, each cutting face 3 is inclined or positioned obliquely so that its longitudinal lines lie at angles to the axis of the cutter. Preferably, as shown, the entire teeth 1 are oblique or inclined and not merely the front cutting faces 3 thereof. Preferably each tooth 1 is generally helical in form, and each cutting face 3 conforms to a helicoid. As illustrated in Figs. 1, 2, 5 and 6, the helicoid is one formed by a generatrix following the axis of the cutter and also following a helix on a cylinder concentric with the axis thereof. The character of the helicoid may, however, be varied. The teeth and the cutting faces may be inclined in either direction and the degree of inclination may be varied as required.

Figs. 5 and 6 show the hob diagrammatically on an enlarged scale. Fig. 5 includes only a section of the hob extending from the line $b$—$b$ to the line $c$—$c$ as indicated in Figs. 1 and 6. It will be obvious that the complete hob comprises a series of sections such as that shown in Fig. 5, the respective inclined cutting faces of all of the sections joining and constituting continuous unitary cutting faces, as shown in Figs. 1, 2 and 6. The section presents a contour which is one of the number of equal elemental contours of which the composite contour of the hob consists.

As before stated, the tongues and the grooves between them correspond in form and spacing to the form and pitch of the threads to be cut. For the form of threads shown the tops of the tongues are provided with "flats," the bottoms of the grooves are provided with other "flats," and inclined surfaces are provided connecting the respective flats. Each elemental contour includes points 4, 5, 6, 6, 5 and 4, the depth of the contour being $d$. At the cutting faces 3 the outer flats 5—4—5 are all at the same distance from the axis, and in fact, all points along each flat are at the same distance from the axis. Similarly, the bottom flats 6—6 are all at the same distance from the axis, and all points along each flat are at the same distance from the axis. Similarly, each inclined line 5—6 connecting the flats is correctly positioned. In fact, the entire effective contour of each cutting face from one end of the hob to the other, is such that, when the hob is rotated, it will define the correct thread contour, one element of this contour being shown by full lines in Fig. 7. This correct effective contour obtains notwithstanding the fact that the cutting face is a warped or helicoidal surface.

Each tooth of the hob is relieved along lines 7 extending backward and inward from the cutting face in planes perpendicular to the hob axis. These relief lines form continuous surfaces which extend from end to end of the hob and which are properly constructed notwithstanding the variations in radius at different points along the thread outline and notwithstanding the variations in angular position resulting from the warped or helicoidal cutting face. The relief lines 7 are maintained in similar relationship to each other as they extend backward and inward, the lines preferably conforming to spirals of Archimedes located in the said planes perpendicular to the axis. The result is that each tooth of the hob at any axial plane of intersection such as 7—7 has a distorted shape, as shown by dotted lines in Fig. 7. This distorted shape includes points 14, 15, 16, 16, 15 and 14 corresponding respectively to the points 4, 5, 6, 6, 5 and 4 of the outline of the cutting face. The distortion of shape results from the fact that the successive inward inclined relief lines 7 start at different angular positions because of the inclined or helicoidal cutting face. Therefore with the cutting face inclined in the direction illustrated the several points 15, 16, 16, 15 and 14 to the left of the point 4 or 14 are spaced inward from the respective points 5, 6, 6, 5 and 4 by progressively increasing distances. Notwithstanding this distortion in shape at an axial plane of intersection, the outline or effective contour at the cutting face is correct, as before stated.

The effective contour at the cutting face is correct, as stated, and this correct effective contour is maintained when the cutting faces 3 are ground backward. In order for this to be true, it is obviously necessary for the hob teeth to present the same shape at successive surfaces of intersection, the said surfaces being similar in form and position to the initial cutting faces 3. At any surface, such as e—e, back of an initial cutting face 3 and similar to the said face, the same effective contour will be found. Therefore if the teeth are ground on their front faces to helicoids which are the same as the helicoids of the initial cutting faces the effective contour will remain the same.

To assist in giving a more complete understanding of my invention, I will set forth a method by which my improved hobs may be made. The method to be described is presented in my copending application for methods of making thread milling hobs, Serial No. 274,530, filed on even date herewith. Another method that may be used is presented in my copending application for methods of making thread milling hobs, Serial No. 274,531, filed on even date herewith. It will be understood, however, that the present invention is in no way limited by the methods which may be employed, and that a hob embodying the invention can be made in any way desired. It will be understood that the preliminary steps of turning the blank, cutting the grooves therein, etc., can be carried on in any usual or preferred way, these steps not requiring any special description. I will herein confine myself to a brief description of a simple form of the method, reference being made to the said application Serial No. 274,530, for a more detailed description and for descriptions of possible variations.

In practising the method use is preferably made of a preliminary rotating milling cutter which is used to form the shape of the successive sections of the hob. In Figs. 8 and 9 I have shown a preliminary milling cutter S which may be used. This preliminary cutter S is provided with longitudinal teeth 21 having grooves 22 between them, the teeth and grooves being parallel with the axis. The teeth 21 have cutting faces 23 conforming to planes intersecting the axis. Preferably the cutter S has exactly the same number of teeth as the hob A. Figs. 10 and 11 show the preliminary cutter S diagrammatically, there being a smaller number of teeth and the inclination of the cutting faces and the relief being increased.

The cutter S has at any axial plane of intersection such as 12—12 a shape which is the same or approximately the same as the predetermined thread contour as shown by dotted lines in Fig. 12. The shape has points $4^s$, $5^s$, $6^s$, $6^s$, $5^s$ and $4^s$ corresponding respectively to the points 4, 5, 6, 6, 5, 4 on the effective contour of the hob A. The front cutting faces 23 of the teeth, are beveled by grinding or otherwise to form helicoidal surfaces in accordance with one step of my novel method.

Each cutting face of the preliminary cutter S, after being ground or otherwise beveled, is helicoidal and preferably has a degree of inclination which is the same as that of the cutting faces of the hob A. When this is the case, as shown, the helix for the preliminary cutter S, along which travels the generatrix of the helicoid, has the same longitudinal pitch as has the corresponding helix for the hob A. The preliminary cutter is preferably much smaller in diameter than the hob and when this is the case, as shown in the drawings, there is an apparent difference in the helicoidal surfaces. While the helicoids are in reality the same, being determined by the same or similar directrices, the actual angle of inclination is less for the preliminary cutter S than for the hob A because of the smaller diameter. It is important that the direction of inclination of the cutting faces be the same for the preliminary cutter as for the hob. If the hob is to have left-hand helicoids as shown the preliminary cutter must also have left-hand helicoids; or if the hob is to have right-hand helicoids the preliminary cutter must have right-hand helicoids.

Each tooth of the preliminary cutter has a degree of relief which is preferably the same as that of the hob. The decrease in radius for each angular increment of advance of the cutter S is the same as the decrease in radius for each angular increment of advance of the hob A. While the degrees of relief are the same, there is an apparent difference because of the smaller diameter of the cutter S.

As the result of the intersection of the helicoidal cutting face of each tooth of the cutter S with the spiral relief lines thereof, the outline or contour of the cutting face is distorted, as shown by full lines in Fig. 12. This distorted contour has points $14^s$, $15^s$, $16^s$, $16^s$, $15^s$, and $14^s$, all points $15^s$, $16^s$, $16^s$, $15^s$ and $14^s$ to the right of the point $4^s$ or $14^s$ being spaced outward from the respectively corresponding points $5^s$, $6^s$, $6^s$, $5^s$ and $4^s$ by progressively increasing distances. Inasmuch as the teeth of the preliminary cutter S are provided with helicoidal cutting faces having the same pitch as the helicoidal cutting faces of the teeth of the hob A and are provided with the same degree of relief as the teeth of the hob A the distortion of the outline $14^s$, $15^s$, $16^s$, $16^s$, $15^s$, $14^s$ is exactly the reverse of the desired distortion of the outlines 14, 15, 16, 16, 15, 14 of the hob, as shown in Fig. 7, the two distortions being the same in extent. The actual inclination of each cutting face of the cutter S is less by reason of the smaller diameter but the amount of relief is more for the same reason, and these differences exactly compensate for each other.

Figs. 13 and 14 show the cutter S being used for shaping a blank to form a section of the hob A. It will be understood that the cutter S is rapidly rotating in the direction indicated by the arrow thereon; that the blank is slowly rotating in the direction indicated by the arrow thereon; and that relieving is effected preferably by moving the preliminary cutter bodily toward the axis of the blank, as indicated by the vertical arrow, and then bodily away from the axis of the blank in the opposite direction. The downward or inward relieving movement is so timed that the resulting relief on the blank will conform to spirals of Archimedes. The cutter S is moved slowly downward during the cutting of each tooth and then is rapidly moved upward between the teeth to position it for the cutting of the next tooth. The preliminary cutter is made with as small a diameter as possible in order to permit it to follow the relief of one tooth without interfering with or cutting into the outline of the next tooth.

Fig. 13 shows the cut being started, the preliminary cutter S being so adjusted that the point $14^s$ on the teeth of the rotating cutter will engage the initial point 4 of the first tooth of the hob blank A. This action is continued till the relative position shown in Fig. 14 is reached. In this milling action the distorted shape of the cutter S causes the desired distortion in the shape of the hob section. The cutter S shapes the hob section with the several points 4, 5, 6, 6, 5 and 4 all at the proper distances form the axis, so that the section when used will generate the true predetermined contour, as shown by full lines in Fig. 7.

The preliminary cutter S can most conveniently be made by means of a lathe tool such as V shown in Figs. 15 and 16, this tool being used in a relieving lathe. The lathe tool V is formed with its top cutting face having a contour $4^v$, $5^v$, $6^v$, $6^v$, $5^v$, $4^v$, which is the same as the effective contour 4, 5, 6, 6, 5, 4, of the teeth of the hob A. In order to make a small correction, as explained in detail in my aforesaid application, Serial No. 274,530, the tool V is preferably set with its top cutting face in a plane at an angle to a plane through the axis of the preliminary cutter S, as indicated in Fig. 16. When the perliminary cutter S is being formed it is rotated in the direction of the arrow, the tool V being moved in and out, as indicated by the horizontal arrow, so as to follow the proper relief lines.

Figs. 17 and 18 are fragmentary front and end views respectively of a hob blank in which one circumferential groove has been milled. The cutter S is shown in operative relation with the hob blank, being at the side thereof instead of at the top thereof as in Figs. 13 and 14. The cutter serves to cut one of the elemental contours on the blank, that is, it serves to cut the circumferential grooves of one set, the operation being the same as that shown in Figs. 13 and 14. As shown, the cutter S is in its outer operative position and is about to move inward to cut the relief on the tooth which has just come into engagement with it. When the circumferential grooves of one set have been cut, relative longitudinal movement must be effected to position the cutter to cut the grooves of the next set at the proper distance from the first grooves, this distance being exactly equal to the longitudinal pitch of the threads to be milled by the hob. This relative movement can be effected by temporarily withdrawing the cutter, moving it endwise and then restoring it to operative position. Fig. 19 shows the cutter thus moved.

I have stated that the cutter S is reciprocated in timed relation with the rotation of the hob blank. This relation is definite while the cutter is cutting the grooves of any given set, but when the cutter is moved endwise into position to cut the grooves of another set the relationship must be varied in accordance with the changing angular positions of the outer edges of the cutting faces. Fig. 19 shows the hob blank with the engaged tooth in the same position as in Fig. 17, but on account of the inclination of the cutting face 3 the said face is too far advanced with respect to the cutter and is not in the proper position. If the same relationship had been maintained between the rotation of the hob blank and the reciprocation of the cutter, the cutter would be in the same outermost operative position which it occupied in Figs. 17 and 18, thus leaving it out of engagement with correct relief lines of the blank by a distance $f$, as shown in Fig. 20. Obviously, the relationship between the cutter and the blank must be varied in order to enable the cutter to cut the necessary relief and at the same time maintain the correct thread contour. Not only must the elemental contour for each section be correct but the contours for the several sections must be properly related so as to provide a correct composite contour. For each section of the hob the required variation in the relationship may be effected by relatively advancing the cutter reciprocation in proportion to the movement of the cutter along the blank from one position to the next, or it may be effected by relatively retarding the rotative movement of the blank in proportion to the cutter movement. In either case the result is to maintain the cutter and the blank in the proper relationship as the cutter is moved longitudinally, and the relative timing is so varied that the cutter always engages the front edge of the tooth when the cutter is in the outer operative position, as shown in Fig. 21. In this figure the blank is shown in the position as in Fig. 20, but the cutter has been moved inward a distance $f$ to properly engage the blank. As the blank rotates the cutter follows the correct lines of relief. It is usually preferable to go over the blank two or more times taking roughing and finishing cuts. This however is a matter of detail that can be varied in accordance with circumstances.

What I claim is:

1. A milling cutter for cutting a predetermined composite contour consisting of a number of equal elemental contours arranged at uniform distances, the said cutter being provided with a plurality of generally longitudinal helical teeth each having a helicoidal front cutting face, the outer edge of each cutting face having a contour adapted to cut the said predetermined composite contour and the outer surface of each tooth behind the cutting face being relieved along lines extending backward and inward from the outer edge of the face in planes perpendicular to the axis.

2. A milling cutter for cutting a predetermined composite contour consisting of a number of equal elemental contours arranged at uniform distances, the said cutter being provided with a plurality of generally longitudinal helical teeth each having a helicoidal front cutting face, the outer edge of each cutting face having a contour adapted to cut the said predetermined composite contour and the outer surface of each tooth behind the cutting face being relieved along lines extending backward and inward from the outer edge of the face in the planes perpendicular to the axis to form the same effective contour behind each face at successive surfaces of intersection similar to the cutting face.

3. A milling cutter for cutting a predetermined composite contour consisting of a number of equal elemental contours arranged at uniform distances and each consisting at least in part of curved lines, the said cutter being provided with a plurality of generally longitudinal helical teeth each having a helicoidal front cutting face, the outer edge of each cutting face having a contour adapted to cut the said predetermined composite contour and the outer surface of each tooth behind the cutting face being relieved along lines extending backward and inward from the outer edge of the face in planes perpendicular to the axis to form the same effective contour behind each face at successive surfaces of intersection similar to the cutting face.

4. A hob for milling threads of a predetermined standard contour, provided with a plurality of generally longitudinal helical teeth each having a helicoidal front cutting face, the outer edge of each cutting face having a contour adapted to cut the said predetermined thread contour and the outer surface of each tooth behind the cutting face being relieved along lines extending backward and inward from the outer edge of the face.

5. A hob for milling threads of a predetermined standard contour, provided with a plurality of generally longitudinal helical teeth each having a helicoidal front cutting face, the outer edge of each cutting face having a contour adapted to cut the said predetermined thread contour and the outer surface of each tooth behind the cutting face being relieved along lines extending backward and inward from the outer edge of the face in planes perpendicular to the axis to form the same effective contour behind each face at successive surfaces of intersection similar to the cutting face.

6. A hob for milling threads of a predetermined standard contour, provided with a plurality of generally longitudinal teeth each having a helicoidal front cutting face, the outer edge of each cutting face having a contour adapted to cut the said predetermined thread contour and the outer surface of each tooth behind the cutting face being relieved along lines extending backward and inward from the outer edge of the face in planes perpendicular to the axis to form the same effective contour behind each face at successive surfaces of intersection similar to the cutting face, the several teeth of the cutter having their contours in register with each other circumferentially.

In testimony whereof, I hereto affix my signature.

FRIEDERICH MÜLLER.